United States Patent
McMullen

(10) Patent No.: US 10,337,557 B1
(45) Date of Patent: Jul. 2, 2019

(54) ROTODYNAMICALLY ISOLATED MAGNETIC COUPLING

(71) Applicant: Upwing Energy, LLC, Cerritos, CA (US)

(72) Inventor: Patrick McMullen, Villa Park, CA (US)

(73) Assignee: Upwing Energy, LLC, Cerritos, CA (US)

( * ) Notice: Subject to any disclaimer, the term of this patent is extended or adjusted under 35 U.S.C. 154(b) by 0 days.

(21) Appl. No.: 15/968,494

(22) Filed: May 1, 2018

(51) Int. Cl.
| F16D 27/01 | (2006.01) |
| F16C 32/04 | (2006.01) |
| H02K 7/09 | (2006.01) |
| E21B 43/12 | (2006.01) |

(52) U.S. Cl.
CPC ............ F16C 32/0406 (2013.01); H02K 7/09 (2013.01); E21B 43/128 (2013.01); *F16C 2352/00* (2013.01); *F16C 2361/41* (2013.01); *F16D 27/01* (2013.01); *Y10T 464/30* (2015.01)

(58) Field of Classification Search
CPC .............. F16C 32/0406; F16C 2361/41; F16C 2352/00; H02K 7/09; F16D 27/01; E21B 43/128; Y10T 464/30
USPC .................. 464/29; 192/110 R, 110 B, 110 S
See application file for complete search history.

(56) References Cited

U.S. PATENT DOCUMENTS

| 3,276,556 A * | 10/1966 | Witt .................... F16D 25/046 192/110 B |
| 9,482,235 B2 * | 11/2016 | Small ..................... F04D 25/026 |
| 2015/0114632 A1 | 4/2015 | Romer et al. |

FOREIGN PATENT DOCUMENTS

GB 2501352 B 11/2017

OTHER PUBLICATIONS

Classification of Gases, The Engineering Toolbox (online) retrieved from the Internet Oct. 1, 2018, <https://www.engineeeringtoolbox.com/classification-gases-d_838.html>. (Year: 2018).*

* cited by examiner

*Primary Examiner* — Greg Binda
(74) *Attorney, Agent, or Firm* — Fish & Richardson P.C.

(57) ABSTRACT

An inner barrel shaft is separate from the shaft of the first rotating machine. A first bearing assembly is configured to support the inner barrel shaft. The first bearing assembly is separate from the first rotating machine. An outer barrel includes an outer barrel shaft that is separate from a shaft of a second rotating machine. The outer barrel is configured to be coupled to the shaft of the second rotating machine. The second rotating machine is configured to drive or be driven by the first rotating machine. The outer barrel is fluidically isolated from the inner barrel. The outer barrel is configured to surround the inner barrel. The outer barrel is magnetically coupled to the inner barrel to co-rotate with the inner barrel. A second bearing assembly is configured to support the outer barrel shaft. The second bearing assembly is separate from the second rotating machine.

11 Claims, 2 Drawing Sheets

ROTODYNAMICALLY ISOLATED MAGNETIC COUPLING

TECHNICAL FIELD

This disclosure relates to magnetic couplings in rotating machines.

BACKGROUND

Rotating equipment is sometimes used in hazardous environments, such as a downhole environment of oil and gas wells, which is very hostile to equipment. The downhole pressures and temperatures are usually higher than the ambient conditions. The downhole fluids can contain very corrosive species, such as $H_2S$ and $CO_2$. In addition, there can be sand, debris, and other solids in the wellbore. The usable life of the equipment exposed to the downhole environment is often much shorter due to different failure modes caused by combining these conditions in different ways. High temperature, high strength, or corrosion-resistant materials are used to extend the life of downhole equipment in many cases. However, the presence of debris and solids can still be detrimental to downhole rotary devices at the physical contact points, for example, bearing surfaces. Therefore, the contact surfaces of the downhole rotary devices are protected by isolating the downhole environment.

Rotary devices have a shaft to transmit torque. The traditional approach to transmit torque is to use a solid shaft with shaft seals around it to isolate downhole fluids from motor, bearings, and other parts which need to be protected from downhole fluids and solids. Seals eventually fail, especially under the pressure, temperature, and corrosive downhole environments. Failure of seals leads to the ingress and exposure to downhole fluid for parts that cannot tolerate the downhole fluids. This eventually causes different failure modes of downhole rotating devices. To fundamentally eliminate all these failure modes, the shaft seal can be eliminated. To do so, a magnetic coupling can be used to transmit torques without a solid or mechanically linked shaft, instead using a magnetic field to transmit torque. When there are no shaft seals, there are no shaft seal failures.

SUMMARY

This disclosure describes technologies relating to rotodynamically isolated magnetic couplings.

An example implementation of the subject matter described within this disclosure is a magnetic coupling assembly with the following features. An inner barrel includes an inner barrel shaft. The inner barrel shaft is configured to co-rotate with the inner barrel. The inner barrel is configured to be coupled to a shaft of a first rotating machine. The inner barrel shaft is separate from the shaft of the first rotating machine. A first bearing assembly is configured to support the inner barrel shaft. The first bearing assembly is separate from the first rotating machine. An outer barrel includes an outer barrel shaft that is separate from a shaft of a second rotating machine. The outer barrel is configured to be coupled to the shaft of the second rotating machine. The second rotating machine is configured to drive or be driven by the first rotating machine. The outer barrel is fluidically isolated from the inner barrel. The outer barrel is configured to surround the inner barrel. The outer barrel is magnetically coupled to the inner barrel to co-rotate with the inner barrel. A second bearing assembly is configured to support the outer barrel shaft. The second bearing assembly is separate from the second rotating machine.

Aspects of the example implementation, which can be combined with the example implementation alone or in combination, include the following. The first bearing assembly that is separate from the first rotating machine. The first bearing assembly supports the inner barrel shaft without substantially supporting the shaft of the first rotating machine.

Aspects of the example implementation, which can be combined with the example implementation alone or in combination, include the following. The second bearing assembly is separate from the second rotating machine. The second bearing assembly supports the outer barrel shaft without substantially supporting the shaft of the second rotating machine.

Aspects of the example implementation, which can be combined with the example implementation alone or in combination, include the following. The first rotating machine includes a pump, a compressor, or an electric generator.

Aspects of the example implementation, which can be combined with the example implementation alone or in combination, include the following. The second rotating machine includes an electric motor or a turbine.

Aspects of the example implementation, which can be combined with the example implementation alone or in combination, include the following. The outer barrel and the second rotating machine are fluidically isolated from an outside environment.

Aspects of the example implementation, which can be combined with the example implementation alone or in combination, include the following. The inner barrel and the first rotating machine are fluidically isolated from an outside environment.

Aspects of the example implementation, which can be combined with the example implementation alone or in combination, include the following. The inner barrel, outer barrel, first rotating machine, and second rotating machine are configured to operate within a wellbore.

Aspects of the example implementation, which can be combined with the example implementation alone or in combination, include the following. The outer barrel includes permanent magnets configured to magnetically couple the outer barrel to the inner barrel.

Aspects of the example implementation, which can be combined with the example implementation alone or in combination, include the following. The inner barrel includes permanent magnets configured to magnetically couple the inner barrel to the outer barrel.

Aspects of the example implementation, which can be combined with the example implementation alone or in combination, include the following. The first bearing assembly or the second bearing assembly comprises magnetic bearings.

An example implementation of the subject matter described within this disclosure is a method of transferring torque with the following features. A first barrel is rotated by a first rotating machine. The first barrel is supported with a first bearing assembly. a shaft of a first rotating machine rotably that is coupled to the first barrel is supported with a second bearing assembly that is separate from the first bearing assembly. A second barrel is rotated in response to rotating the first barrel. The second barrel is magnetically coupled to the first barrel. The first barrel is fluidically isolated from the second barrel. The second barrel is supported with a third bearing assembly that is separate from the first and second bearing assembly.

Aspects of the example method, which can be combined with the example method alone or in combination, include the following. A second rotating machine is rotated by the second barrel. A shaft of the second rotating machine that is rotably coupled to the second barrel is supported with a fourth bearing assembly. The fourth bearing assembly is separate from the first bearing assembly, the second bearing assembly, and the third bearing assembly.

Aspects of the example method, which can be combined with the example method alone or in combination, include the following. The first rotating machine and the first barrel are fluidically isolated from an outside environment.

Aspects of the example method, which can be combined with the example method alone or in combination, include the following. Supporting the first barrel with a first bearing assembly includes magnetically supporting the first barrel.

Aspects of the example method, which can be combined with the example method alone or in combination, include the following. Magnetically supporting the first barrel includes using permanent magnets to generate a magnetic field.

Aspects of the example method, which can be combined with the example method alone or in combination, include the following. Rotating the first barrel and the second barrel includes rotating at high speeds below a first harmonic of either the first barrel or the second barrel.

An example implementation of the subject matter described within this disclosure is a rotating system with the following features. An inner barrel is configured to be rotatably coupled to a first rotating machine. A first bearing assembly is configured to support the inner barrel. A first rotating machine bearing assembly, that is separate from the first bearing assembly, is configured to radially support the first rotating machine. An outer barrel is configured to be rotatably coupled to a second rotating machine. The outer barrel is fluidically isolated from the inner barrel. A second bearing assembly is configured to support the outer barrel. A second rotating machine bearing assembly, that is separate from the first bearing assembly, is configured to radially support the second rotating machine a motor bearing assembly separate from the second bearing assembly.

Aspects of the example rotating system, which can be combined with the example rotating system alone or in combination, include the following. The first bearing assembly supports the inner barrel without substantially supporting the first rotating machine. The second bearing assembly supports the outer barrel without substantially supporting the second rotating machine.

Aspects of the example rotating system, which can be combined with the example rotating system alone or in combination, include the following. The second rotating machine includes a pump, a compressor, or an electric generator.

Aspects of the example rotating system, which can be combined with the example rotating system alone or in combination, include the following. The first rotating machine includes an electric motor or a turbine.

Aspects of the example rotating system, which can be combined with the example rotating system alone or in combination, include the following. The inner barrel and outer barrel have a high first harmonic frequency.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
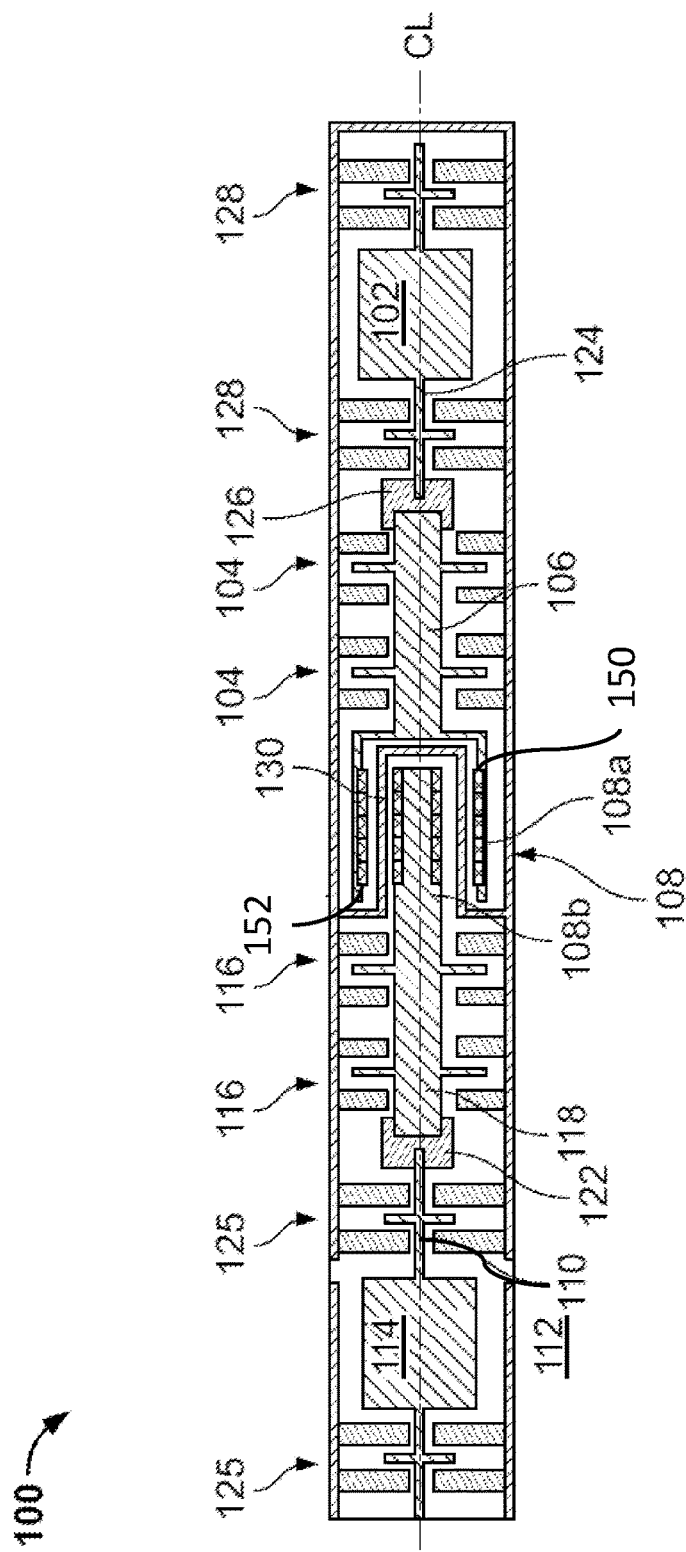
FIG. 1 is a half side cross-sectional view of an example rotating machine that can be used with aspects of this disclosure.

When a radial gap type magnetic coupling, a magnetic coupling with a radial gap between the two coupling components, is used to transmit torque, a can is placed between the internal, or male, coupling rotor and the external, or female, coupling rotor to isolate downhole fluids from a motor unit or any other component which needs to be protected from the downhole environment. In such cases, a protector uses face seals on a shaft to isolate downhole fluids from bearings and the motor as mentioned above. To have a face seal work, the pressure on both sides of the face seal needs to be somewhat equalized. To do so, a pressure-equalizing design, like a rubber bag or labyrinth chamber, is typically adopted. To include all of these features, the protector usually is long, expensive, complicated, and failure-prone. Therefore, eliminating the protector makes downhole rotary devices shorter, less expensive, simpler, and more reliable. By using a magnetic coupling with a sealing can, we achieve the objective of complete elimination of protectors for downhole rotating devices.

In some implementations, such a rotating machine can be used in a downhole environment, such as an electric submersible pump, and can include a driver supported by a set of driver bearings. The driver is configured to rotate the rotating machine and can include an electric motor, gas turbine, diesel engine, or any other driver. A driver shaft is rotated by the driver. Driver bearings support the driver shaft. The driver bearings can include ball bearings, fluid film bearings, or any other type of mechanical bearing. The driver bearings can include passive magnetic bearings, active magnetic bearings, or any combination of magnetic bearings. At a first end of a driver shaft is an outer barrel of a magnetic coupling. The driver shaft and the outer barrel are configured to rotate in unison. A driven rotating machine is supported by the driven bearings. The driven rotating machine converts rotational motion into work. For example, the driven rotating machine can be a pump or compressor that is configured to move fluid. In some implementations, the driven rotating machine can include an electric generator to induce an electric current. The driven bearings can include ball bearings, fluid film bearings, or any other type of mechanical bearing. The driven bearings can include passive magnetic bearings, active magnetic bearings or any combination of magnetic bearings. Attached to an end of the driven rotating machine is an inner, male barrel. The inner barrel and/or outer barrel can include permanent magnets and/or electro magnets. The attractive forces between the female barrel and male barrel allow both barrels to rotate together so that torque is transmitted to a driven rotating machine. A can is used between a male, inner barrel and the female, outer barrel, to isolate the outer barrel and inner barrel from one another. For example, the can sometimes includes a solid surface that connects to an outer housing of the rotating machine, providing a fluid-tight seal. In some instances, one of the rotors, such as the outer barrel, can be fluidically isolated from an outside environment while leaving the other rotor, such as the inner barrel, exposed to the outside environment. In some implementations, the outside environment can include a downhole environment.

The space inside the can, that is, the space isolated from the outside environment, can be filled with inert gas at low pressure to protect, for example, a motor stator and rotor while minimizing the windage loss. In the case of an electric submersible pump, the space inside the can may be filled with gas or a dielectric fluid to provide proper lubrication to the bearings. In such cases, even though the downhole pressure can be higher than the in-can ambient conditions, the motor is isolated from the downhole pressure and its performance is not affected and is very predictable. With such isolation, little to no debris can enter into the can, thus avoiding contact failures. In this case, the rotor inside the can is spinning at a high speed in a low loss, clean, and controlled environment so that the efficiency and reliability of the rotary device is much improved.

Often times, the inner barrel and the outer barrel are configured to rotate in an overhung arrangement, in which the rotors are placed outboard of the driven bearings and the driver bearings, respectively. This disclosure describes a magnetic coupling with isolated barrel shafts to improve rotor-dynamic stability in such an overhung arrangement. A sealing can is placed between female and male magnetic coupling barrels to fluidically isolate the barrels from one another. The barrels are coupled to their respective rotating machines by a rotodynamic isolating coupling. The effective lengths of the female and male rotors are reduced significantly with this arrangement. Therefore, the rotor-dynamic stability of both the rotors with motor and driven part are improved. In some implementations, the diameter of the shaft between the motor and female rotor and the diameter of the shaft between the driven part and the male rotor can be thicker, and therefore stiffer. The stiffer shafts can offer improved rotor-dynamic margins. For example, to transmit enough torque, the size of the female barrel and the male barrel need to be sufficient. For example, the female barrel and the male barrel can be made with a greater length or with a greater radius. As certain applications limit available diameters, such as downhole applications, length is often increased to achieve greater torque transmission. High overhung weights of the female barrel and male barrel lower the frequencies of bending modes, thus lowering rotor-dynamic margins. Also, due to the bearing surface speed limits, the bearing diameter size can be limited. The limitations on the bearing diameter puts constraints on the diameter of the shaft connected to the magnetic coupling rotor. These constraints put an upper limit on the shaft stiffness to support the overhung female and male rotors. The lower the shaft stiffness, the lower the rotor-dynamic margins.

FIG. 1 is a half side cross-sectional view of a rotating machine 100 that can be used with aspects of this disclosure. The rotating machine 100 includes an inner barrel 108b with an inner barrel shaft 118. The inner barrel shaft 118 co-rotates with the inner barrel 108b. The inner barrel 108b is configured to be coupled to a shaft 110 of a first rotating machine 114 with a first coupling 122. The inner barrel shaft 118 is separate from the shaft 110 of the first rotating machine 114. That is, the coupling 122 transfers torque between the inner barrel shaft 118 and the rotating machine shaft 110, but the two shafts are rotodynamically isolated. In some implementations, the first coupling 122 can be a bellows, diaphragm, spline, quill or other type at allow for motion of each shaft independent of the other with little or no resultant response, i.e., each can move independent of the other. The coupling, regardless of types or forms, is flexible to accommodate lateral or angular misalignments between shafts 110 and 118, where misalignment of 0.1 mm or less is desired. The coupling has reasonable radial and bending stiffness to keep the rotor-dynamic properties for shafts 110 and 118 under control. The coupling lateral stiffness will can be between 100 and 1000 lbf/in, with a bending stiffness of 10 to 100 in-lbf/rad. Higher or lower stiffness couplings can be potentially used too. The first coupling 122 can be configured to transfer axial push and/or pull forces between the two shafts 110 and 118. The first coupling 122 provides enough capability of transmitting torques from shaft 110 to 188 or vice versa. In some implementations, the first rotating machine 114 can include a pump, a compressor, or an electric generator.

A first bearing assembly 116 is configured to support the inner barrel shaft 118. The first bearing assembly 116 is separate from the first rotating machine 114. A first rotating machine bearing assembly 125 is separate from the first bearing assembly 116 of the inner barrel shaft 118. The first rotating machine bearing assembly 125 is configured to radially and/or axially support the first rotating machine 114. In other words, the first bearing assembly 116 is separate from the first rotating machine 114, and the first bearing assembly 116 supports the inner barrel shaft 118 without substantially supporting the shaft 110 of the first rotating machine 114. That is, the shaft 110 of the first rotating machine 114 is supported by the separate rotating machine bearing assembly 125. Negligible support is provided by the first bearing assembly 116 through the coupling 122. This separation helps at least partially rotodynamically isolate the rotating machine shaft 110 from the inner barrel shaft 118. With the described arrangement, the equivalent shaft length of both the rotating machine shaft 110 and the inner barrel shaft 118 is shorter, allowing for a higher first harmonic frequency, increasing rotodynamic margins. With the described arrangement, the inner barrel shaft 118 and the first rotating machine shaft 110 can have different diameters, allowing the outer barrel shaft to be thicker to increase the first harmonic frequency, increasing the rotodynamic margins.

While the illustrated bearings in the example implementations are magnetic bearings, mechanical bearings can also be used. In instances where magnetic bearings are used, the magnetic bearings can include passive magnetic bearings and/or active magnetic bearings. In instances where mechanical bearings are used, the mechanical bearings can include fluid film bearings and/or antifriction bearings, such as ball bearings. In some implementations, a combination of mechanical and magnetic bearings can be used.

An outer barrel 108a has an outer barrel shaft 106 that is separate from a shaft 124 of a second rotating machine 102. The outer barrel shaft 106 is configured to be coupled to the shaft 124 of the second rotating machine 102 with a second coupling 126. The second rotating machine 102 is configured to drive or be driven by the first rotating machine 114. The outer barrel shaft 106 is separate from the shaft 124 of the second rotating machine 102. That is, the coupling 126 transfers torque between the outer barrel shaft 106 and the rotating machine shaft 110, but the two shafts are rotodynamically isolated. In some implementations, the second coupling 126 can be a bellows, diaphragm, spline, quill or other type at allow for motion of each shaft independent of the other with little or no resultant response, i.e., each can move independent of the other. The coupling, regardless of types or forms, is flexible to accommodate lateral or angular misalignments between shafts 106 and 124, where misalignment of 0.1 mm or less is desired. The coupling has reasonable radial and bending stiffness to keep the rotor-dynamic properties for shafts 106 and 124 under control. The coupling lateral stiffness will can be between 100 and 1000 lbf/in, with a bending stiffness of 10 to 100 in-lbf/rad. Higher or lower stiffness couplings can be potentially used too. The second coupling 126 can be configured to transfer axial push and/or pull forces between the two shafts 106 and 124. The second coupling 126 provides enough capability of transmitting torques from shaft 106 to 124 or vice versa. In some implementations, the second rotating machine 102 can include an electric motor or a turbine.

A second bearing assembly 104 is configured to support the outer barrel shaft 106. The second bearing assembly 104 is separate from the second rotating machine 102. A second rotating machine bearing assembly 128 is separate from the first bearing assembly 104. The second rotating machine bearing assembly 128 is configured to radially and/or axially support the second rotating machine 102 separate from the second bearing assembly 104. In other words, the second bearing assembly 104 is separate from the second rotating machine 102, and the second bearing assembly 104 supports the outer barrel shaft 106 without substantially supporting the shaft 124 of the second rotating machine 102. That is, the shaft 106 of the second rotating machine 102 is supported by the separate rotating machine bearings 128. Negligible support is provided by the second bearing assembly 104 through the coupling 126. This separation helps at least partially rotodynamically isolate the rotating machine shaft 110 from the outer barrel shaft 106. With the described arrangement, the equivalent shaft length of both the rotating machine shaft 110 and the outer barrel shaft 106 is shorter, allowing for a higher first harmonic frequency, increasing rotodynamic margins. With the described arrangement, the outer barrel shaft 106 and the second rotating machine shaft 124 can have different diameters, allowing the outer barrel shaft to be thicker to increase the first harmonic frequency, increasing the rotodynamic margins.

While the illustrated bearings in the example implementations are magnetic bearings, mechanical bearings can also be used. In instances where magnetic bearings are used, the magnetic bearings can include passive magnetic bearings and/or active magnetic bearings. In instances where mechanical bearings are used, the mechanical bearings can include fluid film bearings and/or antifriction bearings, such as ball bearings. In some implementations, a combination of mechanical and magnetic bearings can be used.

The outer barrel 108a is fluidically isolated from the inner barrel 108b by an isolation can 130. The outer barrel 108a is configured to surround the inner barrel 108b. The outer barrel 108a is magnetically coupled to the inner barrel 108b so that both barrels co-rotate with one another. In some implementations, the inner barrel 108b and/or the outer barrel 108a can include permanent magnets 150 and/or permanent magnets 152 to magnetically couple the inner barrel 108b and the outer barrel 108a. In some implementations, the inner barrel 108b and/or the outer barrel 108a can include electro-magnets to magnetically couple the inner barrel 108b and the outer barrel 108a.

In some implementations, the can 130 isolates the inner barrel 108b and the first rotating machine 114 fluidically from an outside environment 112. In some implementations, the outer barrel 108a and the second rotating machine 102 are fluidically isolated from an outside environment 112 by the can 130. In some implementations, the inner barrel 108b, outer barrel 108a, first rotating machine 114, and second rotating machine 102 are configured to operate within a wellbore.

Figure 2:
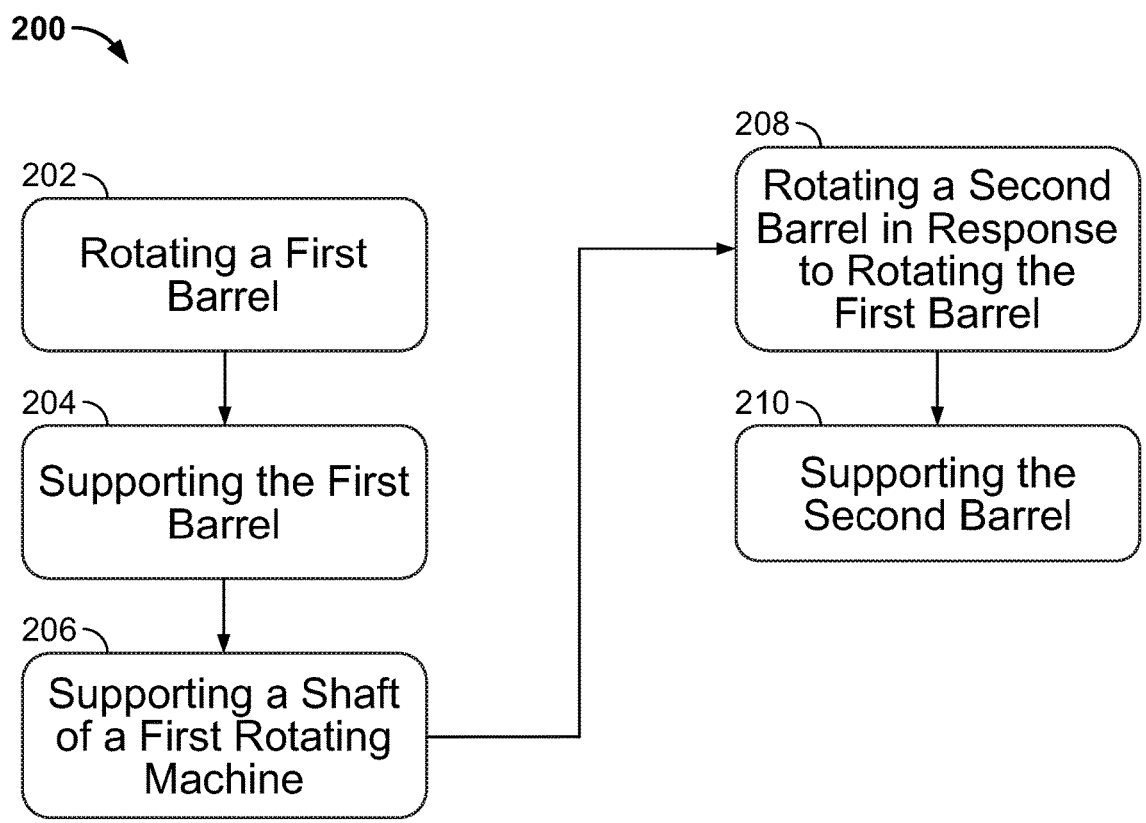
FIG. 2 is a flowchart of an example method that can be used with aspects of this disclosure.

FIG. 2 is flowchart of an example method 200 that can be used with aspects of this disclosure. At 202, a first barrel is rotated by a first rotating machine. At 204, the first barrel is supported with a first bearing assembly. At 206, a shaft of a first rotating machine, which is rotably coupled to the first barrel, is supported with a second bearing assembly that is separate from the first bearing assembly. At 208, a second barrel is rotated in response to rotating the first barrel. The second barrel is magnetically coupled to the first barrel. The first barrel is fluidically isolated from the second barrel. At 210, the second barrel is supported with a third bearing assembly that is separate from the first and second bearing assembly.

In some implementations, a second rotating machine is rotated by the second barrel. A shaft of the second rotating machine, which is rotably coupled to the second barrel, is supported with a fourth bearing assembly. The fourth bearing assembly is separate from the first bearing assembly, the second bearing assembly, and the third bearing assembly. In some implementations, the first rotating machine and the first barrel are fluidically isolated from an outside environment.

In some implementations, supporting the first barrel and/or second barrel with the bearing assembly includes magnetically supporting the first barrel and/or second barrel. In some implementations, magnetically supporting the first and/or second barrel includes using permanent magnets to generate a magnetic field. In some implementations, magnetically supporting the first and/or second barrel includes using electromagnets to generate a magnetic field.

In some implementations, rotating the first barrel and the second barrel includes rotating at high speeds below a first harmonic of either the first barrel or the second barrel. For example, rotating at or above 6000 RPMs without encountering a first harmonic. Improved rotor-dynamic margins can result in high speeds. For example, in some implementations, speeds may be as low as 6,000 rpm or as high as 120,000 rpm. While the coupled components have an optimal speed range at which they are most efficient, this does not prevent the combined system from running at less efficient speeds to achieve a desired performance characteristic.

While this disclosure contains many specific implementation details, these should not be construed as limitations on the scope of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described components and systems can generally be integrated together in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A magnetic coupling assembly comprising:
   an inner barrel comprising an inner barrel shaft, the inner barrel shaft configured to co-rotate with the inner barrel, the inner barrel configured to be coupled to a shaft of a first rotating machine, the inner barrel shaft being separate from the shaft of the first rotating machine;
   a first bearing assembly configured to support the inner barrel shaft, the first bearing assembly being separate from the first rotating machine;
   an outer barrel comprising an outer barrel shaft that is separate from a shaft of a second rotating machine, the outer barrel configured to be coupled to the shaft of the second rotating machine, the second rotating machine configured to drive or be driven by the first rotating machine, the outer barrel being fluidically isolated from the inner barrel, the outer barrel configured to surround the inner barrel, the outer barrel being magnetically coupled to the inner barrel to co-rotate with the inner barrel; and
   a second bearing assembly configured to support the outer barrel shaft, the second bearing assembly being separate from the second rotating machine.

2. The magnetic coupling assembly of claim 1, wherein the first bearing assembly being separate from the first rotating machine comprises the first bearing assembly supporting the inner barrel shaft without substantially supporting the shaft of the first rotating machine.

3. The magnetic coupling assembly of claim 1, wherein the second bearing assembly being separate from the second rotating machine comprises the second bearing assembly supporting the outer barrel shaft without substantially supporting the shaft of the second rotating machine.

4. The magnetic coupling assembly of claim 1, wherein the first rotating machine comprises a pump, a compressor, or an electric generator.

5. The magnetic coupling assembly of claim 1, wherein the second rotating machine comprises an electric motor or a turbine.

6. The magnetic coupling assembly of claim 1, wherein the outer barrel and the second rotating machine are fluidically isolated from an outside environment.

7. The magnetic coupling assembly of claim 1, wherein the inner barrel and the first rotating machine are fluidically isolated from an outside environment.

8. The magnetic coupling assembly of claim 1, wherein the inner barrel, outer barrel, first rotating machine, and second rotating machine are configured to operate within a wellbore.

9. The magnetic coupling assembly of claim 1, wherein the outer barrel comprises permanent magnets configured to magnetically couple the outer barrel to the inner barrel.

10. The magnetic coupling assembly of claim 1, wherein the inner barrel comprises permanent magnets configured to magnetically couple the inner barrel to the outer barrel.

11. The magnetic coupling assembly of claim 1, wherein the first bearing assembly or the second bearing assembly comprises magnetic bearings.

* * * * *